United States Patent
Etezadi et al.

(10) Patent No.: US 10,680,745 B2
(45) Date of Patent: Jun. 9, 2020

(54) BLIND DETECTION OF PREEMPTED RESOURCES IN ORTHOGONAL FREQUENCY DIVISION MULTIPLEXING (OFDM) SYSTEMS

(71) Applicant: Samsung Electronics Co., Ltd., Gyeonggi-do (KR)

(72) Inventors: Farrokh Etezadi, San Diego, CA (US); Hyukjoon Kwon, San Diego, CA (US); Kee-Bong Song, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 16/037,647

(22) Filed: Jul. 17, 2018

(65) Prior Publication Data

US 2019/0319740 A1  Oct. 17, 2019

Related U.S. Application Data

(60) Provisional application No. 62/656,131, filed on Apr. 11, 2018.

(51) Int. Cl.
| | |
|---|---|
| *H04L 1/00* | (2006.01) |
| *H04L 1/18* | (2006.01) |
| *H04L 27/26* | (2006.01) |
| *H04L 5/00* | (2006.01) |
| *H04W 72/04* | (2009.01) |

(52) U.S. Cl.
CPC .......... *H04L 1/0038* (2013.01); *H04L 1/0057* (2013.01); *H04L 1/1812* (2013.01); *H04L 5/0053* (2013.01); *H04L 27/2607* (2013.01); *H04W 72/0446* (2013.01)

(58) Field of Classification Search
CPC ... H04L 1/0038; H04L 1/0057; H04L 1/1812; H04L 5/0053; H04L 27/2607; H04W 72/0446
See application file for complete search history.

(56) References Cited

U.S. PATENT DOCUMENTS

| | | | |
|---|---|---|---|
| 7,590,184 | B2 | 9/2009 | McCoy |
| 8,149,969 | B2 | 4/2012 | Khan et al. |
| 8,930,800 | B2 | 1/2015 | Li et al. |
| 8,938,663 | B2 | 1/2015 | Zopf |
| 9,703,627 | B2 | 7/2017 | Weng |
| 2017/0099121 | A1* | 4/2017 | Uchino ................. H04L 1/1812 |
| 2017/0353866 | A1 | 12/2017 | Gou et al. |
| 2017/0353963 | A1* | 12/2017 | Hong .................... H04L 1/1812 |
| 2018/0034596 | A1* | 2/2018 | Noh ....................... H04L 1/1812 |

(Continued)

FOREIGN PATENT DOCUMENTS

| | | |
|---|---|---|
| WO | WO 2011/043579 | 4/2011 |
| WO | WO 2018/034421 | 2/2018 |

*Primary Examiner* — Maharishi V Khirodhar
*Assistant Examiner* — Kenneth P Hunt
(74) *Attorney, Agent, or Firm* — The Farrell Law Firm, P.C.

(57) ABSTRACT

A system and method for blind detection of preempted resources in an orthogonal frequency division multiplexing (OFDM) system is herein disclosed. According to one embodiment, a method for blind detection of resources in an eMBB pre-empted by a URLLC includes receiving soft information including at least one code block, attempting to decode the at least one code block, and running URLLC blind detection on the at least one code block with the decoding attempt fails.

20 Claims, 10 Drawing Sheets

(56) References Cited

U.S. PATENT DOCUMENTS

| | | | |
|---|---|---|---|
| 2018/0035332 A1 | 2/2018 | Agiwal et al. | |
| 2018/0070255 A1* | 3/2018 | Hong | H04L 5/0091 |
| 2018/0191462 A1* | 7/2018 | Kwon | H04L 1/0038 |
| 2018/0324830 A1* | 11/2018 | Islam | H04L 5/0094 |
| 2019/0190645 A1* | 6/2019 | Sano | H04L 1/0069 |
| 2019/0280802 A1* | 9/2019 | Ma | H04W 76/11 |
| 2019/0349960 A1* | 11/2019 | Li | H04L 1/1812 |

* cited by examiner

BLIND DETECTION OF PREEMPTED RESOURCES IN ORTHOGONAL FREQUENCY DIVISION MULTIPLEXING (OFDM) SYSTEMS

PRIORITY

This application is based on and claims priority under 35 U.S.C. § 119(e) to a U.S. Provisional patent application filed on Apr. 11, 2018 in the United States Patent and Trademark Office and assigned Ser. No. 62/656,131, the entire contents of which are incorporated herein by reference.

FIELD

The present disclosure relates generally to wireless communication devices, and more particularly, to blind detection of preempted resources in an orthogonal frequency division multiplexing (OFDM) system.

BACKGROUND

In 5th generation (5G) new radio (NR) technology, two services include ultra-reliable low-latency communication (URLLC) and eMBB (e.g., gigabytes in a second). Each eMBB transmission slot includes one or more code blocks (CBs). However, URLLC may preempt resources allocated to eMBB without notice to the eMBB. Thus, the eMBB may proceed with URLLC preempted resources, degrading eMBB functionality.

SUMMARY

According to one embodiment, a method for blind detection of resources in a communication system is provided. The method includes receiving soft information including at least one code block, attempting to decode the at least one code block, and when the attempting to decode fails, running URLLC blind detection on the at least one code block.

According to one embodiment, a communication system is provided. The system includes a temporary buffer configured to receive soft information including at least one code block, a hybrid automatic repeat request (HARQ) buffer configured to store HARQ information to be combined with the soft information, a channel decoder configured to receive the combined soft information and HARQ information and attempt to decode the at least one code block, and a URLLC blind detector configured to detect whether the at least one code block is pre-empted by the URLLC when an attempt to decode the at least one code block fails.

According to one embodiment, an electronic device is provided. The electronic device includes a processor and a non-transitory computer readable storage medium configured to store instructions that, when executed, cause the processor to receive soft information including at least one code block, determine whether eMBB resources are pre-empted by a URLLC on the at least one code block by blindly detecting URLLC on the at least one code block and decode the at least one code block.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
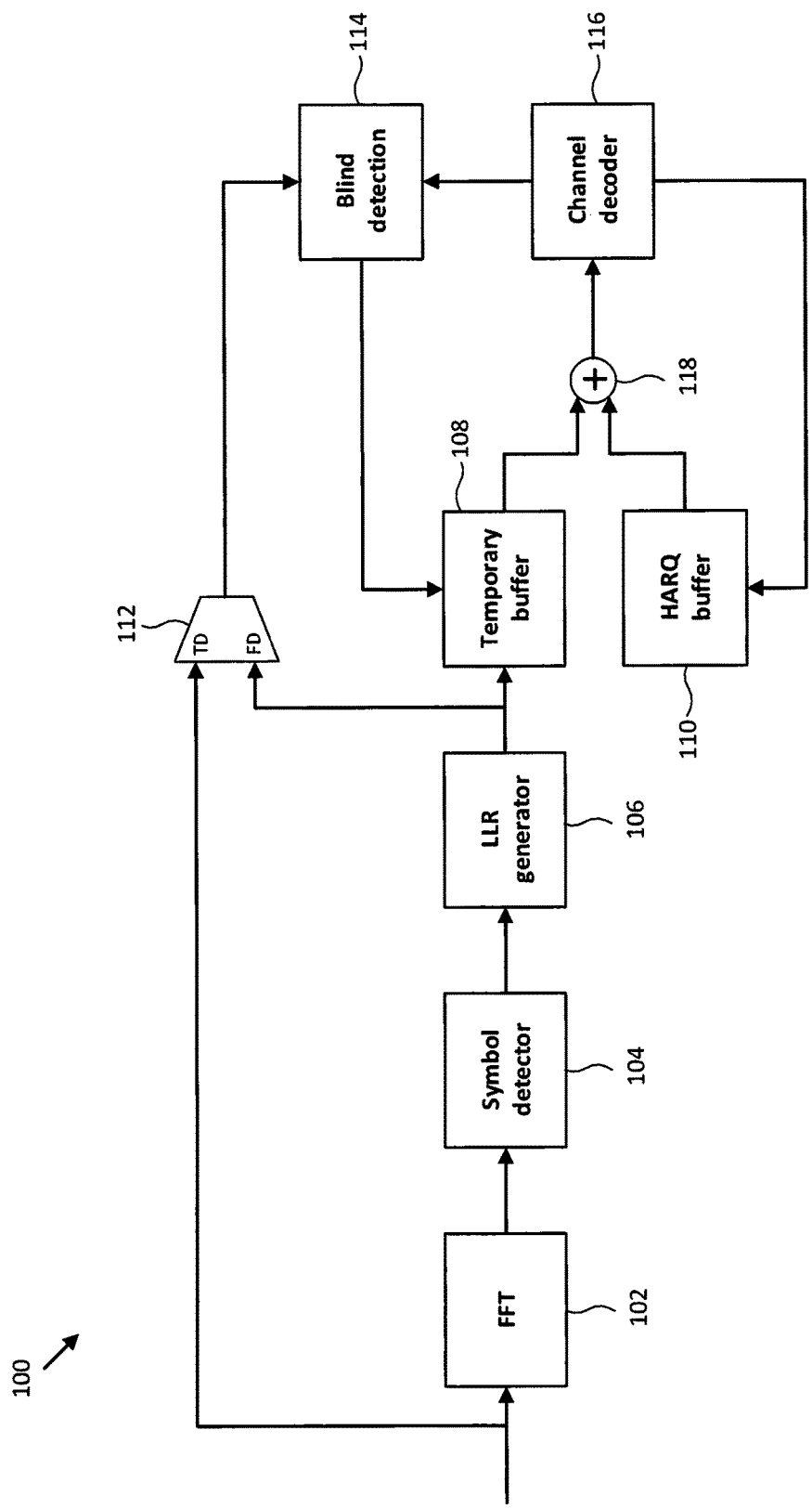
FIG. 1 is a diagram of a blind detection (BD) system with a double-decoder-run architecture, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., by wire), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In 5$^{th}$ generation (5G) new radio (NR) technology, two services are defined: ultra-reliable low-latency communication (URLLC) (e.g., remote robotics, surgery, vehicular traffic efficiency); and enhanced mobile broad band (eMBB) (e.g., gigabytes in a second). Each eMBB transmission slot (e.g., 14 orthogonal frequency division multiplexing (OFDM) symbols), includes one or more code block groups (CBGs) and each CBG includes one or more code blocks (CBs).

In order to serve the low-latency demand of a URLLC user equipment (UE), a base station, referred to as a gNodeB, may preempt resources allocated to an eMBB UE without prior notification for the eMBB UE. Thus, the resources of the eMBB UE are partially preempted and allocated to the URLLC UE. This creates an issue, especially for hybrid automatic repeat-request (HARQ) combining. Since the eMBB UE does not know whether the resource that is supposed to be assigned to the eMBB is allocated to the URLLC UE or not, the eMBB UE may update a HARQ buffer with the data for the URLLC UE, which is useless to eMBB. In order to prevent unwanted HARQ combining, the eMBB UE has to be informed about the preempted resources in order to properly handle the associated information in retransmissions. For such a purpose, the CBG based communication is considered in NR, and the 3$^{rd}$ generation partnership project (3GPP) radio layer 1 (RAN1) has designed two mechanisms of informing the eMBB UE regarding the preempted CBGs: (1) CBG-flushing information (CBGFI) which is a one-bit indicator, indicating whether a previous transmit block (TB) (re)transmission is preempted; and (2) Preemption Indication (PI) which is communicated to eMBB UE through group common physical downlink control channel (PDCCH) and provides the preemption timing information with granularity of 1, 2 or 4 symbols.

In such mechanisms, the eMBB UE is notified about the preemption after receiving/processing of the preempted/garbage data. Unless additional memory is provided to UE to store the suspicious data for later processing/combining, the eMBB UE combines the garbage data with all the stored useful data from the past (re)transmissions. The granularity of preemption indication is out of the UE's control. In particular, CBGFI is the whole TB level indication. Therefore, even if the preemption affects a much smaller region of a whole TB, the UE might flush the whole information. Also, not all the PIs are OFDM symbol level indicators.

The systems and methods described herein provide preemption blind detection (BD), where the eMBB UE attempts to blindly detect the preempted resources and accordingly handles the data in HARQ combining. The various blind detection systems and methods significantly improve eMBB UE's communication throughput in case of URLLC preemptions.

The systems and methods herein may provide preemption BD, where the eMBB UE attempts to blindly detect the resources preempted by URLLC in a time domain (TD) or in a frequency domain (FD), and accordingly handles the data in combining using a single-decoder-run architecture (e.g., blind detection runs for all OFDM symbols) or a double-decoder-run architecture (e.g., blind detection runs only for OFDM symbols that fail to be decoded). For the double-decoder-run architecture, symbol processing including a channel decoder runs twice. The systems and methods may be applicable to any type of communication system (e.g., an OFDM system) when an adversary service (e.g., URLLC) preempts the resources of a primary service (e.g., eMBB).

The systems and methods described herein allow storing of information without an additional buffer. For example, if URLLC is preempted in the middle of retransmissions and the PI/CBGFI is indicated, the already-stored HARQ buffer also needs to be flushed. URLLC BD is a real-time operation such that it can prevent the corruption of HARQ buffer. As an eMBB UE is blindly detecting URLLC-corrupted OFDM symbols and eliminating the associated soft information constantly, all the clean soft information is usable without the corrupted information. The HARQ combining procedure remains as normal and no additional HARQ buffer is required.

The system and method further prevents corruption of the HARQ buffer. If the URLLC is preempted in the middle of retransmissions and the PI (or CBGFI) is indicated, the already-stored HARQ buffer also needs to be flushed. The URLLC BD system and method provides real-time operation to prevent the corruption of the HARQ buffer.

The systems and methods described herein further increase a success rate of CB decoding. It is expected that the time duration of URLLC is very short due to its sub-carrier spacing (SCS) and mini-slot duration. Consequently, it is expected that only a few number of OFDM symbols of CB (and CBG) for eMBB is affected by URLLC. If the URLLC corrupted soft information is omitted, the decoder can succeed to decode eMBB data that cannot be decoded without omission. The correct BD results prevent the retransmission of a whole CBG and as a result it significantly improves efficiency.

FIG. 1 is a diagram of a blind detection (BD) system 100 with a double-decoder-run architecture, according to an embodiment. The BD system 100 includes a fast Fourier transform (FFT) circuit 102, a symbol detector 104, an LLR generator 106, a temporary buffer 108, a HARQ buffer 110, a multiplexer 112, a blind detection circuit 114, and a channel decoder 116.

The BD system 100 with a double-decoder-run architecture may be configured to blindly detect the CB with failed decoding only. Soft information including at least one CB is fed through the FFT 102 to generate an FD received signal. The FD received signal is then input into the symbol detector 104 for detecting symbols (e.g., OFDM symbols) present in the soft information. The detected symbols from the symbol detector 104 are input into the LLR generator 106 to generate an LLR of coded bits/symbols for the CB. In this BD system 100, the eMBB UE first stores the soft information of CBs to be decoded in the temporary buffer 108 before the soft information is combined at combiner 118 with data stored in the HARQ buffer 110. The soft information is stored in the temporary buffer 108 with previous HARQ information from the HARQ buffer 110, and allows the channel decoder 116 to attempt to decode the CB.

Figure 2:
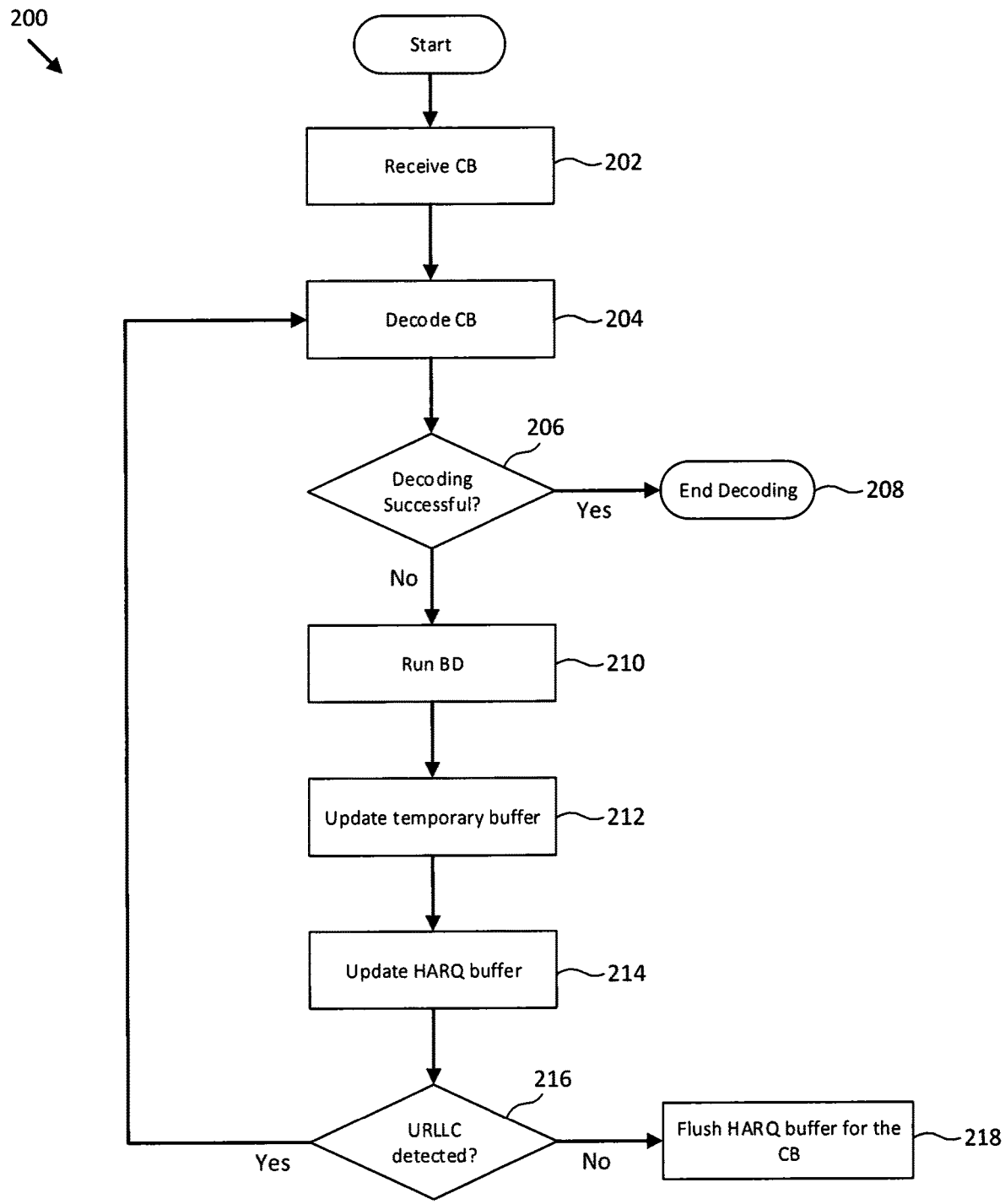
FIG. 2 is a flowchart for blind detection with a BD system having the double-decoder-run architecture, according to an embodiment.

FIG. 2 is a flowchart 200 for blind detection with a BD system 100 having the double-decoder-run architecture, according to an embodiment. At 202 of flowchart 200, the channel decoder 116 receives a CB and attempts to decode the CB at 204. At 206, if the channel decoder 116 successfully decodes the combined soft information, this means that the decoded resources are definitely associated with eMBB and there is no need to run URLLC BD (e.g., the attempted decoding is successful) such that the decoding can end at 208. If the decoding is not successful, at 210, the BD system 100 runs URLLC BD with the BD circuit 116 using TD and/or FD signals selected and output from the multiplexer 112. The BD system 100 then updates the temporary buffer 108 at 212 and updates the HARQ buffer 110 at 214. The BD system 100 may perform the updating steps at 212 and 214 when determining whether the BD at 210 is finished, and the BD system 100 may determine whether to update the temporary buffer 108 with preemption information (PI) into the HARQ buffer 110.

At 216, if URLLC is detected, the BD system 100 performs a second attempt of decoding with the channel decoder 116. In particular, the soft information of OFDM symbols, or the corresponding CBGs, detected as URLLC are omitted (i.e., least likelihood ratios (LLRs) are replaced by zero). If the URLLC is not blindly detected (e.g., if the URLLC PI received for the CB indicates that URLLC is not detected), the HARQ buffer 110 is flushed at 218 for that specific CB. For the CBs with failed decoding and detected as URLLC by the BD system 100, the soft information is flushed and the symbol processing block runs for the second time.

Figure 3:
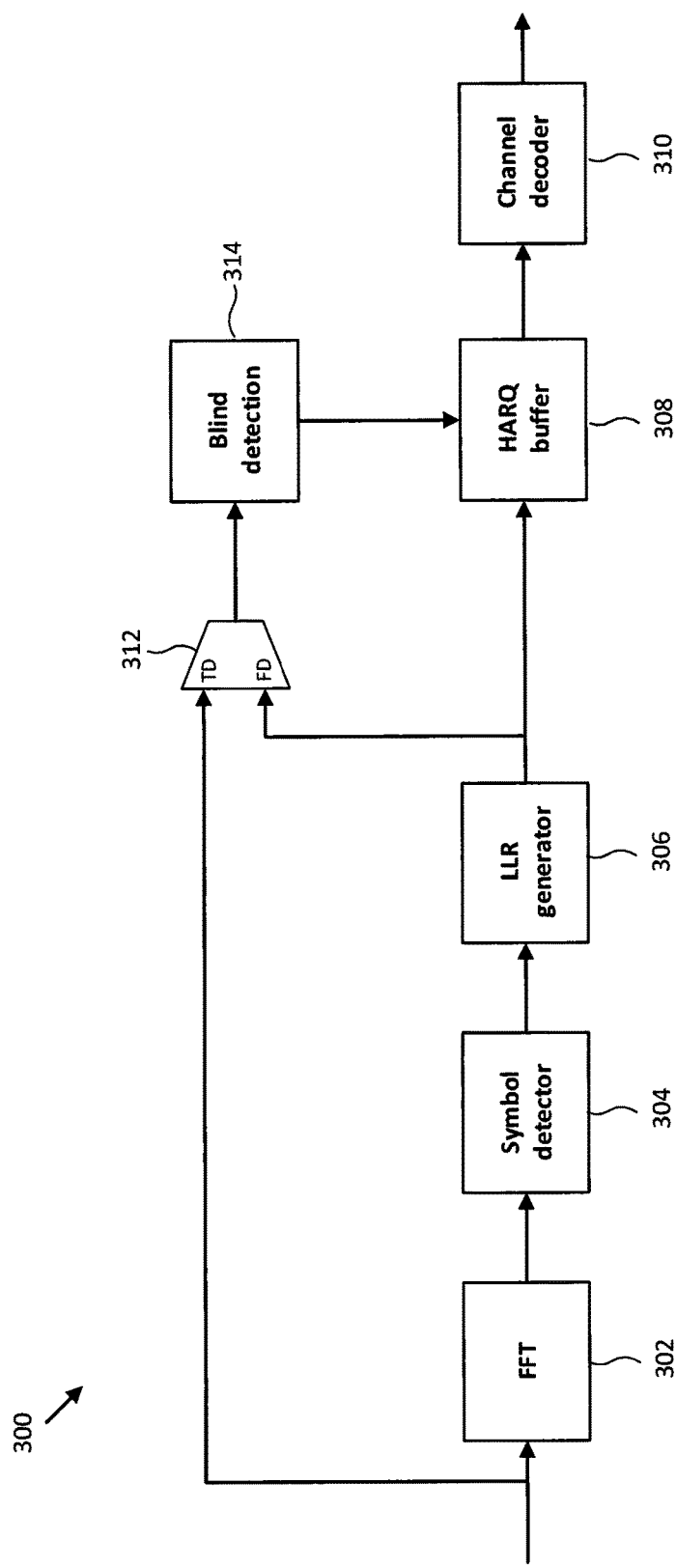
FIG. 3 is a diagram of a BD system with a single-decoder-run architecture, according to an embodiment.

FIG. 3 is a diagram of a BD system 300 with a single-decoder-run architecture, according to an embodiment. The BD system 300 includes an FFT 302, a symbol detector 304, an LLR generator 306, a HARQ buffer 308, a channel decoder 310, a multiplexer 312, and a blind detection circuit 314. Soft information including at least one CB is fed through the FFT 302 to generate an FD received signal. The FD received signal is then input into the symbol detector 304 for detecting symbols (e.g., OFDM symbols) present in the soft information. The detected symbols from the symbol detector 304 are input into the LLR generator 306 to generate an LLR of coded bits/symbols for the CB. TD information and/or FD information output from TD/FD processing circuit 312 are fed to the URLLC BD circuit 314.

Figure 4:
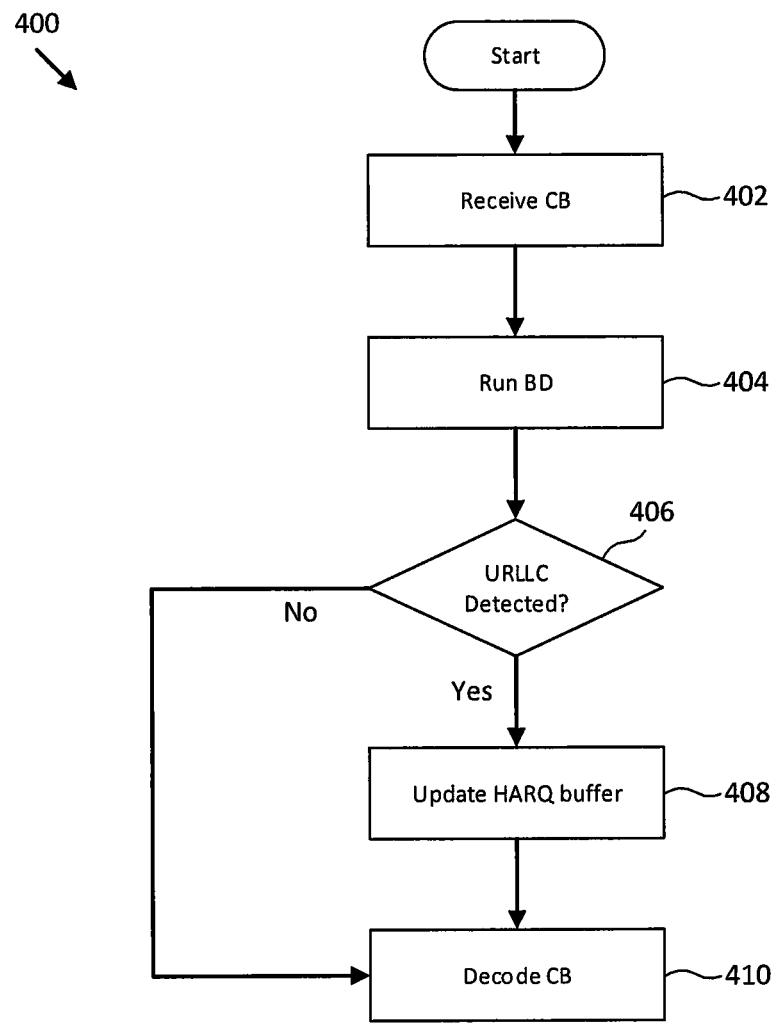
FIG. 4 is a flowchart for blind detection with a BD system having the single-decoder-run architecture, according to an embodiment.

FIG. 4 is a flowchart 400 for blind detection with a BD system 300 having the single-decoder-run architecture, according to an embodiment. At 402 of flowchart 400, the BD system 300 receives a CB. At 404, the BD circuit 314 runs blind detection on the CB with TD and/or FD information selected and output from the multiplexer 312. At 406, if no URLLC is detected at 404, the CB is decoded at 410 with the channel decoder 310. At 406, if URLLC is detected in the CB, the BD system 300 updates the HARQ buffer 308. The single-decoder-run architecture of BD system 300 with the single decoder 310 may include a decision engine to update the HARQ buffer 308 by replacing the LLR (detected as corrupted URLLC from the BD circuit 314) with zero and updating the HARQ buffer 308 accordingly. Then the channel decoder 310 decodes the CB at 410. If the PI is received, the HARQ buffer 308 may be flushed for corresponding LLRs.

In the BD system 100 as described in FIG. 1, the chance of throwing out the URLLC-free soft information due to BD's false alarm is low as only the CBs that fail to be decoded are tested by URLLC BD. This comes with the cost of higher computational complexity as for those failed CBs, the channel decoder 116 is required to run twice. Another approach would be running URLLC BD over all the OFDM symbols of all CBs as is described with the BD system 300 in FIG. 3. The BD system 300 has a lower computational complexity is therefore theoretically more sensitive to false alarm caused by URLLC BD.

According to one embodiment, the systems and methods provide a time-domain (TD) scheme for blind detection of URLLC-corrupted OFDM symbols. In the time-domain, the system calculates the time domain cyclic prefix (CP) correlation for eMBB and URLLC, and compares the ratio of the two correlation values with a threshold. In one embodiment, an expected URLLC numerology is known and is different from the eMBB numerology. Suppose that URLLC is using a different (higher) sub-carrier spacing (e.g., URLLC of 60 kHz and eMBB of 15 kHz) which is a typical scenario of usage. The system provides a CP-correlation based scheme. For a TD approach, it may be assumed that (1) the numerology of the URLLC UE is known and is different from that of the eMBB UE, and (2) the eMBB OFDM symbol boundary is synched with that of the URLLC UE.

SCS ratio may be defined in Equation (1) as:

$$a \triangleq \frac{URLLC\ Sub\_Carrier\ Spacing}{eMBB\ Sub\_Carrier\ Spacing} \tag{1}$$

The system provides URLLC BD detection with a fixed SCS ratio. The eMBB UE may need to run URLLC BD for all allowed SCS ratios.

$x_i$ is defined to be the time domain sample of time i. Also in Equation (2), define:

$$\tilde{x}_k(i) \triangleq x_{(k-1)T+i}, i \in [1,T] \tag{2}$$

to be the time domain samples of eMBB OFDM symbol k. Furthermore, assume that the first $T_{CP}(k)$ samples of $\tilde{x}_k(i)$ belong to CP. Also, define $\tilde{y}_{k,k'}(i)$, $i \in [1, T_\alpha(k')]$, $k' \in [1, \alpha]$ to represent k'th URLLC OFDM symbol located at the kth eMBB OFDM symbol. There are $\alpha$ URLLC symbols per eMBB symbol. Assume that the first $T'_{CP}(k,k')$ samples of $\tilde{y}_{k,k'}(i)$ to be the CP samples of k'th URLLC OFDM symbol located at kth eMBB OFDM symbol.

Figure 5:
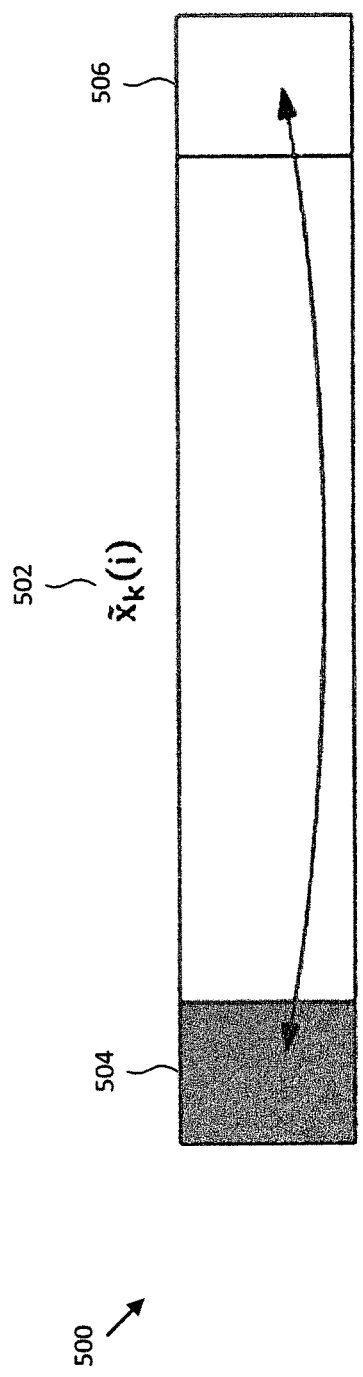
FIGS. 5 and 6 are diagrams of cyclic prefix based time-domain URLLC blind detection symbols respectively, according to an embodiment.
Figure 6:
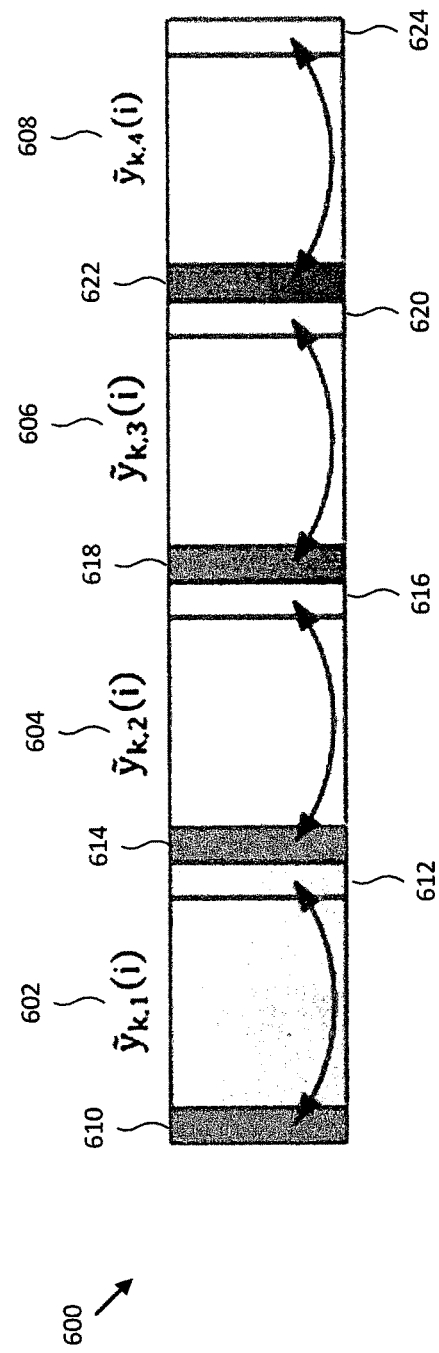

FIG. 5 is a diagram 500 of CP-correlation based TD URLLC BD symbols, according to an embodiment. FIG. 6 is a diagram 600 of CP-correlation based TD URLLC BD symbols, according to an embodiment.

Referring to FIGS. 5 and 6, diagram 500 is a eMBB TD symbol 502 at 15 kHz SCS and diagram 600 shows URLLC TD symbols 602, 604, 606, and 608 at 60 kHz SCS. In symbol 502, the portion 504 is the CP portion of the symbol. Portions 504 and 506 are regions to calculate the correlation. In symbol 602, portion 610 is the CP portion of the symbol, and portions 610 and 612 are regions to calculate the correlation. In symbol 604, portion 614 is the CP portion of the symbol and portions 614 and 616 are regions to calculate the correlation. In symbol 606, portion 618 is the CP portion, and portions 618 and 620 are regions to calculate the correlation. In symbol 608, portion 622 is the CP portion, and portions 622 and 624 are regions to calculate the correlation.

For each eMBB OFDM symbol (e.g., symbol 502), the UE calculates normalized cross-correlation terms for eMBB and URLLC in Equations (3), (4) and (5) as follows:

$$C_{eMBB}(k) \triangleq \frac{\left|\sum_{i=1}^{T_{CP}(k)} \tilde{x}_k(i)\tilde{x}_k^*(T-T_{CP}(k)+i)\right|}{\sqrt{\left(\sum_{i=1}^{T_{CP}(k)} |\tilde{x}_k(i)|^2\right)\left(\sum_{i=1}^{T_{CP}(k)} |\tilde{x}_k(T-T_{CP}(k)+i)|^2\right)}} \tag{3}$$

$$C_{URLLC}(k) \triangleq \frac{1}{\alpha}\sum_{k'=1}^{\alpha} \frac{\left|\sum_{i=1}^{T'_{CP}(k,k')} \tilde{y}_{k,k'}(i)\tilde{y}_{k,k'}^*(T_\alpha(k') - T'_{CP}(k,k')+i)\right|}{\sqrt{\left(\sum_{i=1}^{T'_{CP}(k,k')} |\tilde{y}_{k,k'}(i)|^2\right)\left(\sum_{i=1}^{T'_{CP}(k,k')} |\tilde{y}_{k,k'}^*(T_\alpha(k') - T'_{CP}(k,k')+i)|^2\right)}} \tag{4}$$

$$D_k = I\left(\frac{C_{URLLC}(k)}{C_{eMBB}(k)} \geq \gamma_{TD-CPCorrK}\right), \tag{5}$$

$I(\cdot)$ is the indicator function and $\gamma_{TD-CPCorrK}$ is a threshold value to be optimized. The output $D_k \in \{0,1\}$ denotes whether the kth eMBB symbol is URLLC corrupted or not.

In another scenario, when the URLLC numerology is unknown to the eMBB UE, the eMBB UE only calculates the cross-correlation term as shown in Equation (6):

$$C_{eMBB}(k) \triangleq \frac{\left|\sum_{i=1}^{T_{CP}(k)} \tilde{x}_k(i)\tilde{x}_k^*(T-T_{CP}(k)+i)\right|}{\sqrt{\left(\sum_{i=1}^{T_{CP}(k)} |\tilde{x}_k(i)|^2\right)\left(\sum_{i=1}^{T_{CP}(k)} |\tilde{x}_k(T-T_{CP}(k)+i)|^2\right)}} \tag{6}$$

and the URLLC detection indicator $D_k \in \{0,1\}$ in Equation (7) as:

$$D_k = I(C_{eMBB}(k) \leq \gamma_{TD-CPCorrU}), \tag{7}$$

for each eMBB OFDM symbol, where $I(\cdot)$ is the indicator function and $\gamma_{TD-CPCorrU}$ is a threshold value to be optimized. The output $D_k$ denotes whether the kth eMBB symbol is URLLC corrupted or not.

According to one embodiment, the systems and methods provide a frequency-domain (FD) scheme for blind detection of URLLC-corrupted OFDM symbols. The systems and methods may provide FD modulation likelihood (FD-ModL) tracking. In a frequency domain, BD can be performed by checking R symbols' probabilities whether they belong to M layers of eMBB constellation C or not. The modulation likelihood function for the kth OFDM symbol can be written as Equation (8):

$$L_k \triangleq p(y_{1,k}, y_{2,k}, \ldots, y_{R,k} \mid C, M) = \prod_{r=1}^{R} \frac{1}{\pi\sigma^2} \frac{1}{|C|^M} \sum_{s \in C^M} \exp\left(-\frac{1}{\sigma^2}\|y_{r,k} - H_k s\|^2\right) \tag{8}$$

Taking the logarithm, the log-likelihood can be defined in Equation (9) as:

$$l_k \triangleq \frac{1}{R}\ln L_k = \frac{1}{R}\sum_{r=1}^{R} \ln\left(\sum_{s \in C^M} \exp\left(-\frac{1}{\sigma^2}\|y_{r,k} - H_k s\|^2\right)\right) - \ln(\pi\sigma^2|C|^M) \tag{9}$$

The eMBB expects a small variation of the log-likelihood metric $l_k$ among different OFDM symbols. URLLC corruption violates this expectation. The second term in the definition of $l_k$ can be assumed to be constant regardless of OFDM symbols index k so that Equation (9) may be modified as follows in Equation (10):

$$\check{l}_k \triangleq l_k + \ln(\pi\sigma^2|C|^M) = \frac{1}{R}\sum_{r=1}^{R} \ln\left(\sum_{s \in C^M} \exp\left(-\frac{1}{\sigma^2}\|y_{r,k} - H_k s\|^2\right)\right) \tag{10}$$

k is a OFDM symbol index, $l_k$ a modulation likelihood, c is a constellation, m is a number of layers, and R is a number of resource elements (REs) in OFDM symbol k.

The likelihood metrics are averaged over one OFDM symbol. The change of the consecutive values may be compared against a threshold and indicates URLLC detection if the average metric does not satisfy the threshold. The changes of $\check{l}_c$ may be monitored instead of $l_k$. If a sharp drop of $I_k$ from eMBB OFDM symbol to URLLC OFDM symbol or vice versa is detected, a URLLC symbol is detected.

Figure 7:
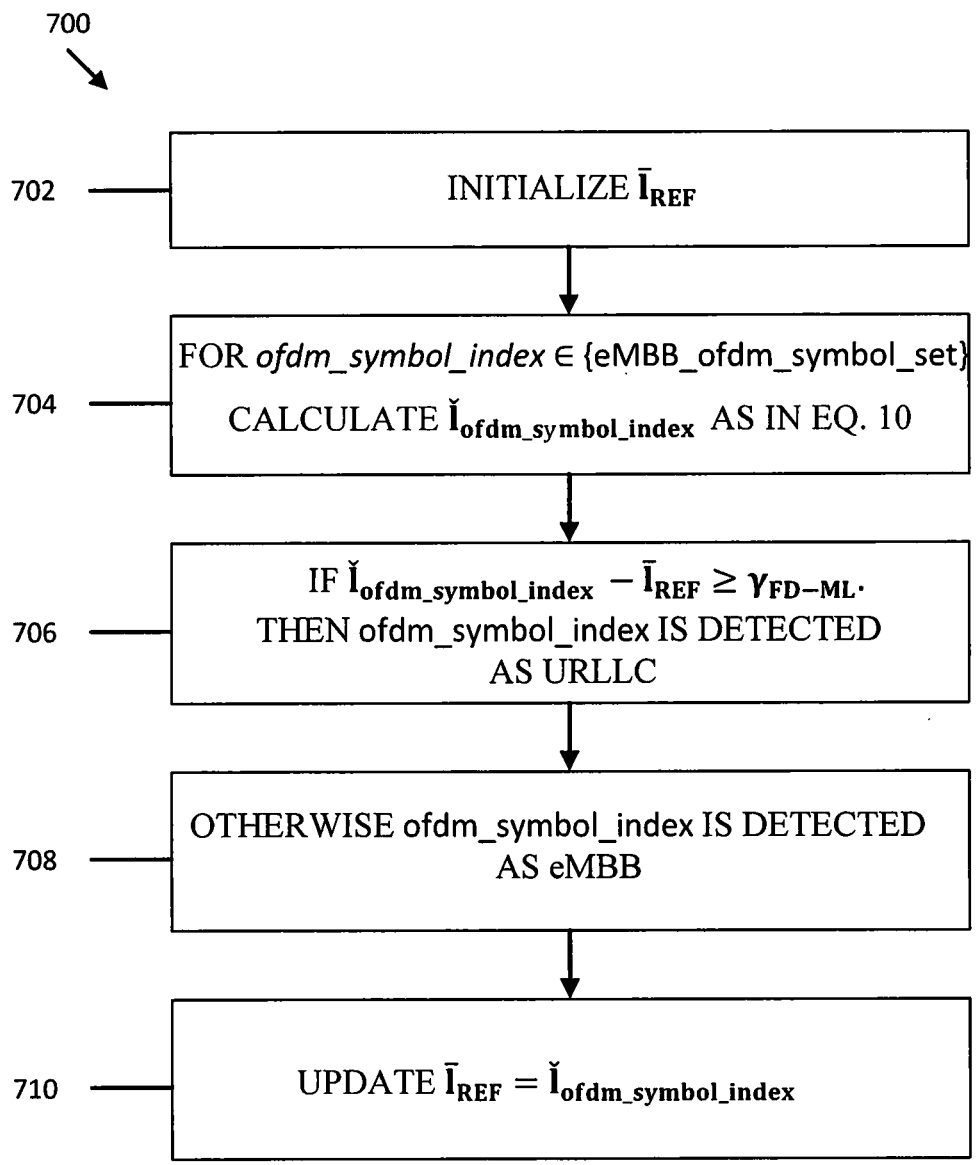
FIG. 7 is a flowchart for detecting changes of a least-likelihood ratio metric, according to an embodiment.

FIG. 7 is a flowchart 700 for detecting changes of an LLR metric, according to an embodiment. Flowchart 700 may represent illustrative code for detecting the changes of $I_k$ among different OFDM symbols. At 702 $I_{REF}$ is initiated, which is an internal parameter. For example, $I_{REF}$ can be initialized to $I_k$ that is calculated for a symbol k which is known to be URLLC-free transmission. At 704, a particular OFDM symbol index, ofdm_symbol_index, $I_{ofdm\_symbol\_index}$ is calculated as described in Equation (10) above and implemented. This is the normalized modulation likelihood whose variation over OFDM symbols is being monitored for URLLC BD. At 706, if the change of $I_{ofdm\_symbol\_index}$ in comparison to $I_{REF}$ is larger than a fixed threshold $\gamma_{FD-ML}$, OFDM symbol ofdm_symbol_index is detected as URLLC. Otherwise, at 708, OFDM symbol ofdm_symbol_index is detected as eMBB. If the OFDM symbol ofdm_symbol_index is detected as eMBB at 708, then, at 710, $I_{REF}$ is updated. The process repeats for every eMBB symbol.

In one embodiment, the threshold values as described may be pre-defined parameters that are calculated offline and remain fixed during the transmission. The flowchart 700 of FIG. 7 may require $I_{REF}$ to be pre-determined. It may be assumed that there exists an initial eMBB OFDM symbol at early times which is believed to be URLLC-free. Then an initial value of $I_{REF}$ may be set to be the $I_k$ for that OFDM symbol, such as FD-ModL, calculated for that specific OFDM symbol. That clean OFDM symbol may be the first OFDM symbol carrying PDSCH per slot, considering the fact that the modulation coding scheme (MCS) can vary per slot. $I_{REF}$ may also be calculated off-line as a function of signal-to-noise ratio (SNR) and MCS. When UE expects a certain SNR and MCS, a corresponding $I_{REF}$ value form a look-up table (LUT)

In another embodiment, the systems and methods provide FD approximate modulation likelihood (FD-AppModL) tracking. The previous log-likelihood function as defined regarding FD modulation likelihood tracking may be approximated to use euclidian distances (EDs) only, as shown in Equations (11) and (12):

$$\tilde{l}_k \triangleq \frac{1}{R}\sum_{r=1}^{R}\left(-\frac{1}{\sigma^2}\|y_{r,k} - H_k s_{min}\|^2\right) \quad (11)$$

where $$s_{min} \triangleq \underset{s \in C^M}{\operatorname{argmin}} \|y_{r,k} - H_k s\|^2 \quad (12)$$

i.e., $s_{min}$ is the hard detected symbol based on Euclidian distance. A method such as that of FIG. 7 may be used for detecting the sharp drop in $\tilde{l}_k$ to detect URLLC OFDM symbols.

In another embodiment, the FD approximate modulation likelihood tracking may be approximated as Equation (13):

$$\tilde{l}_k \triangleq \frac{1}{R}\sum_{r=1}^{R}\left(-\frac{1}{\sigma^2}\|y_{r,k} - H_k s_{min}\|^2 - \Delta_r\right) \quad (13)$$

where $\Delta_r$ is an estimation bias. The cases where $\Delta_r=0$ and $\Delta_r>0$ can also be considered.

According to one embodiment, the systems and methods provide for blind detection of preempted resources in an OFDM communication system, where an eMBB UE does not have prior notification of the OFDM symbol preempted by a URLLC UE, includes: if providing blind detection of only OFDM symbols that fail to be decoded, running a decoder twice—first decoding fails to decode the failed OFDM symbol and second decoding is symbol processing without soft information from symbols detected as URLLC; if blind detection of all OFDM symbols, running the decoder once—symbol processing without soft information from symbols detected as URLLC, where the blind detection is either based on cross-correlation in a time domain or modulation likelihood tracking in a frequency domain.

Figure 8:
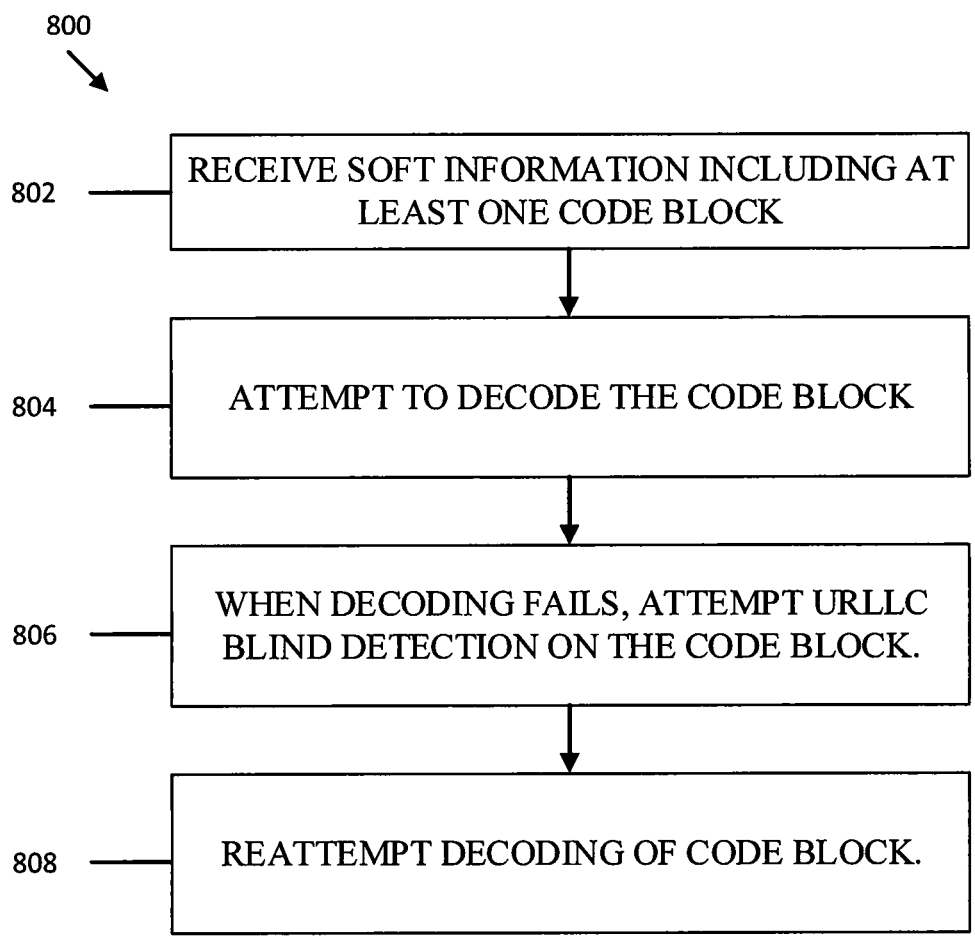
FIG. 8 is a flowchart for URLLC blind detection, according to an embodiment.

FIG. 8 is a flowchart 800 for a double decoder run URLLC BD system, according to an embodiment. At 802, the system receives soft information including at least one code block is received. The soft information may include code blocks, code block groups, and/or symbols. The soft information may be received at an eMBB, electronic device, system, buffer, etc. At 804, the system attempts to decode code blocks. In some examples, decoding will be successful, which may indicate that no URLLC is present in the decoded block. At 806, when decoding fails, the system attempts URLLC BD on the code block. The system, with URLLC BD, may detect whether the resources (indicated by the CB) are preempted by the URLLC. The URLLC BD may be time domain based, frequency domain based, or both. At 808, the system reattempts decoding of the CB (or the soft information) based on whether URLLC is blindly detected in the CB.

Figure 9:
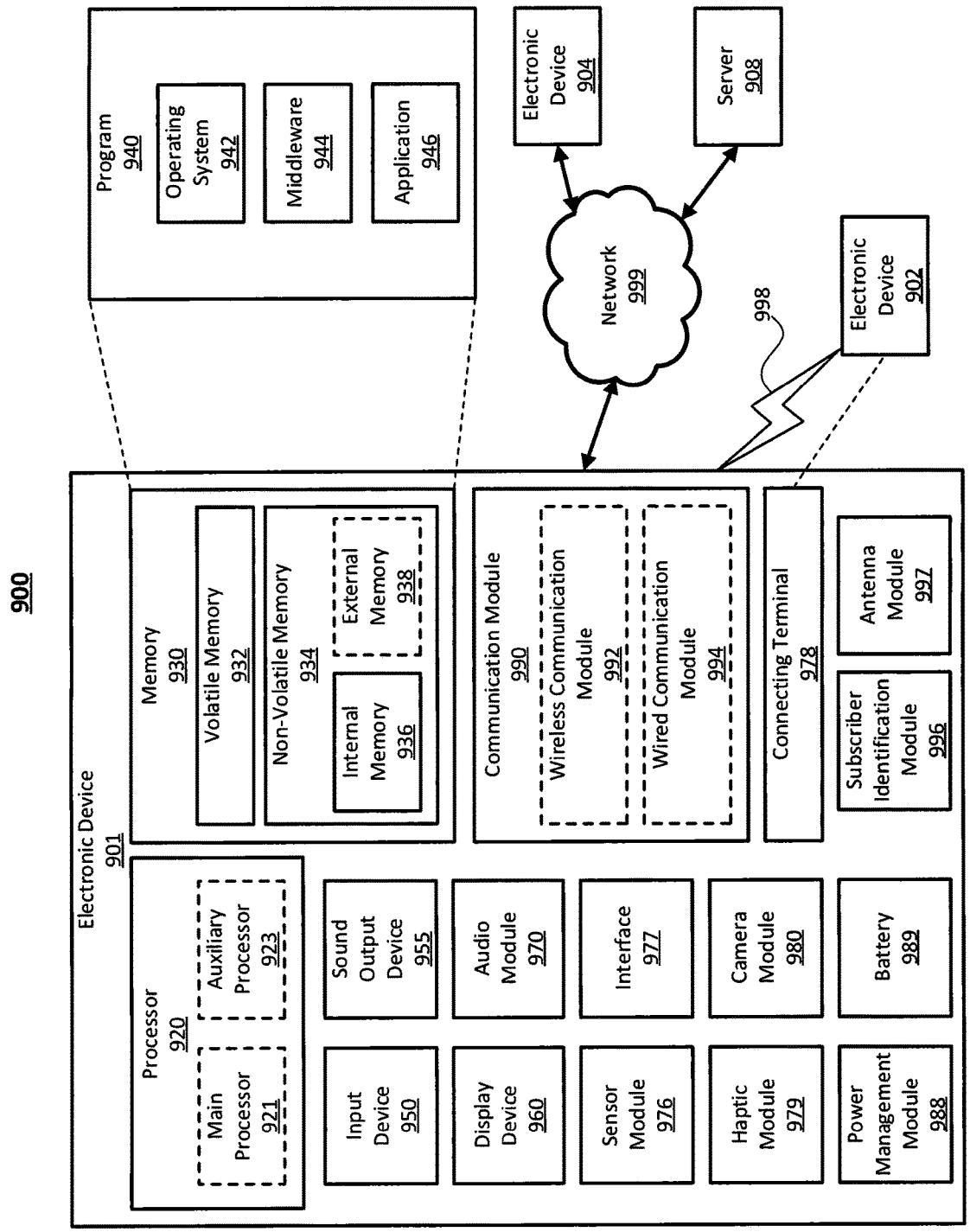
FIG. 9 is a block diagram of an electronic device in a network environment, according to one embodiment.

FIG. 9 is a block diagram of an electronic device 901 in a network environment 900, according to one embodiment.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to one embodiment, the electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, and an antenna module 997. In one embodiment, at least one (e.g., the display device 960 or the camera module 980) of the components may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920, and may perform various data processing or computations. According to one embodiment, as at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. According to one embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, or output the sound via the sound output device 955 or a headphone of an external electronic device (e.g., electronic device 902) directly (e.g., by wire) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to one embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., by wire) or wirelessly. According to one embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to one embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. According to one embodiment, the haptic module 979 may include, for example, a motor, a piezoelectric element, or an electrical stimulator.

The camera module 980 may capture a still image or moving images. According to one embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to one embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the SIM 996.

The antenna module 997 may transmit or receive a signal or power to or from the outside (e.g., the external electronic device) of the electronic device 901. According to one embodiment, the antenna module 997 may include one or more antennas, and therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to one embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor 920 of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 10:
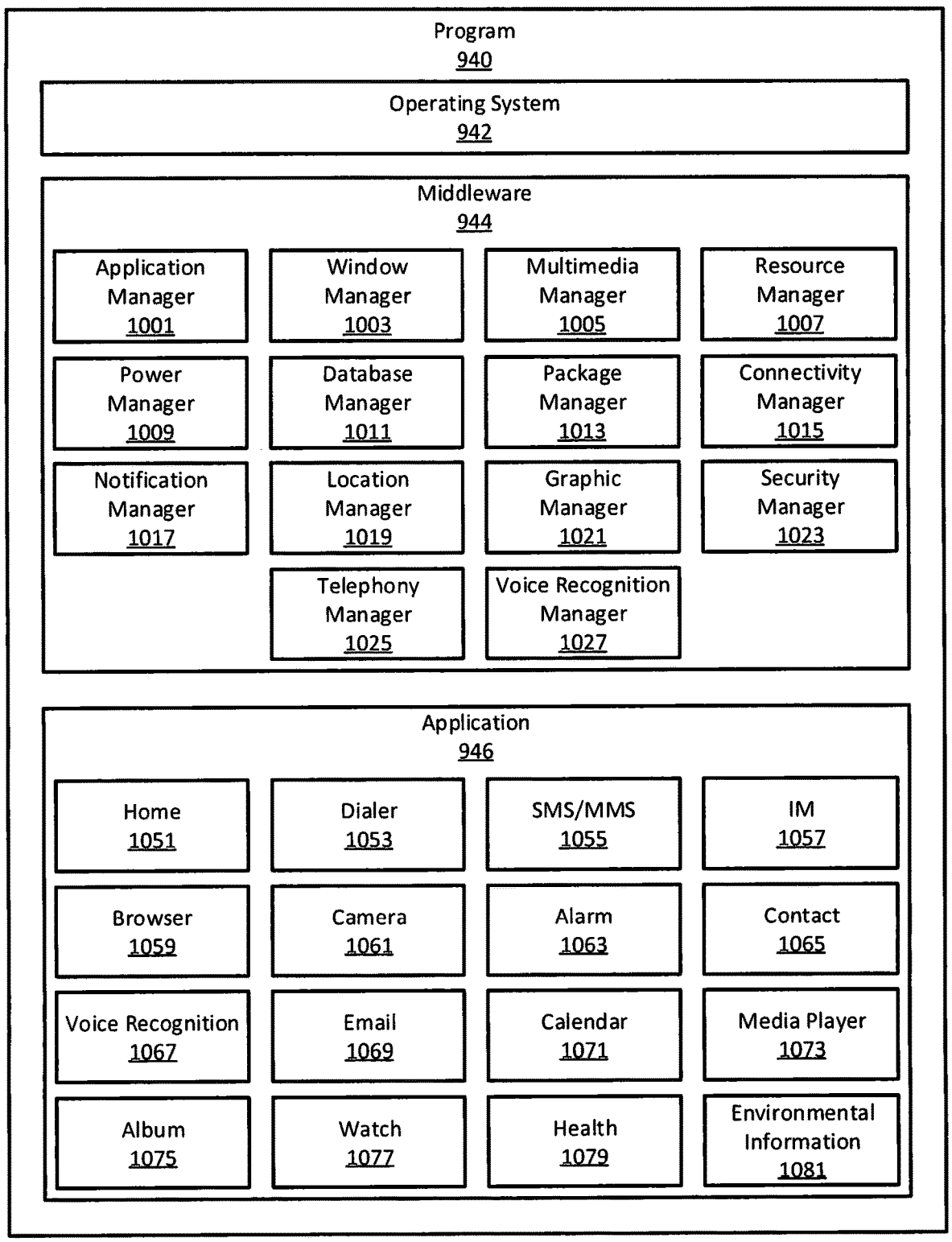
FIG. 10 is a block diagram of a program, according to one embodiment.

FIG. 10 is a block diagram of the program 940 according to one embodiment.

Referring to FIG. 10, the program 940 may include an OS 942 to control one or more resources of the electronic device 901, middleware 944, or an application 946 executable in the OS 942. The OS 942 may include, for example, Android®, iOS®, Windows®, Symbian®, Tizen®, or Bada™. At least part of the program 940, for example, may be pre-loaded on the electronic device 901 during manufacture, or may be downloaded from or updated by an external electronic device (e.g., the electronic device 902 or 904, or the server 908) during use by a user.

The OS 942 may control management (e.g., allocation or deallocation) of one or more system resources (e.g., process, memory, or power source) of the electronic device 901. The OS 942, additionally or alternatively, may include one or more driver programs to drive other hardware devices of the electronic device 901, for example, the input device 950, the sound output device 955, the display device 960, the audio module 970, the sensor module 976, the interface 977, the haptic module 979, the camera module 980, the power management module 988, the battery 989, the communication module 990, the SIM 996, or the antenna module 997.

The middleware 944 may provide various functions to the application 946 such that a function or information provided from one or more resources of the electronic device 901 may be used by the application 946. The middleware 944 may include, for example, an application manager 1001, a window manager 1003, a multimedia manager 1005, a resource manager 1007, a power manager 1009, a database manager 1011, a package manager 1013, a connectivity manager 1015, a notification manager 1017, a location manager 1019, a graphic manager 1021, a security manager 1023, a telephony manager 1025, or a voice recognition manager 1027.

The application manager 1001, for example, may manage the life cycle of the application 946. The window manager 1003, for example, may manage one or more GUI resources that are used on a screen. The multimedia manager 1005, for example, may identify one or more formats to be used to play media files, and may encode or decode a corresponding one of the media files using a codec appropriate for a corresponding format selected from the one or more formats. The resource manager 1007, for example, may manage the source code of the application 946 or a memory space of the memory 930. The power manager 1009, for example, may manage the capacity, temperature, or power of the battery 989, and determine or provide related information to be used for the operation of the electronic device 901 based at least in part on corresponding information of the capacity, temperature, or power of the battery 989. According to one embodiment, the power manager 1009 may interoperate with a basic input/output system (BIOS) of the electronic device 901.

The database manager 1011, for example, may generate, search, or change a database to be used by the application 946. The package manager 1013, for example, may manage installation or update of an application that is distributed in the form of a package file. The connectivity manager 1015, for example, may manage a wireless connection or a direct connection between the electronic device 901 and the external electronic device. The notification manager 1017, for example, may provide a function to notify a user of an occurrence of a specified event (e.g., an incoming call, message, or alert). The location manager 1019, for example, may manage locational information on the electronic device 901. The graphic manager 1021, for example, may manage one or more graphic effects to be offered to a user or a user interface related to the one or more graphic effects.

The security manager 1023, for example, may provide system security or user authentication. The telephony manager 1025, for example, may manage a voice call function or a video call function provided by the electronic device 901. The voice recognition manager 1027, for example, may transmit a user's voice data to the server 908, and receive, from the server 908, a command corresponding to a function to be executed on the electronic device 901 based at least in part on the voice data, or text data converted based at least in part on the voice data. According to one embodiment, the middleware 944 may dynamically delete some existing components or add new components. According to one embodiment, at least part of the middleware 944 may be included as part of the OS 942 or may be implemented in other software separate from the OS 942.

The application 946 may include, for example, a home application 1051, a dialer application 1053, a short message service (SMS)/multimedia messaging service (MMS) application 1055, an instant message (IM) application 1057, a browser application 1059, a camera application 1061, an alarm application 1063, a contact application 1065, a voice recognition application 1067, an email application 1069, a calendar application 1071, a media player application 1073, an album application 1075, a watch application 1077, a health application 1079 (e.g., for measuring the degree of workout or biometric information, such as blood sugar), or an environmental information application 1081 (e.g., for measuring air pressure, humidity, or temperature information). According to one embodiment, the application 946 may further include an information exchanging application that is capable of supporting information exchange between the electronic device 901 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 1069) of the electronic device 901 to the external electronic device. Additionally or alternatively, the notification relay application may receive notification information from the external electronic device and provide the notification information to a user of the electronic device 901.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 11:
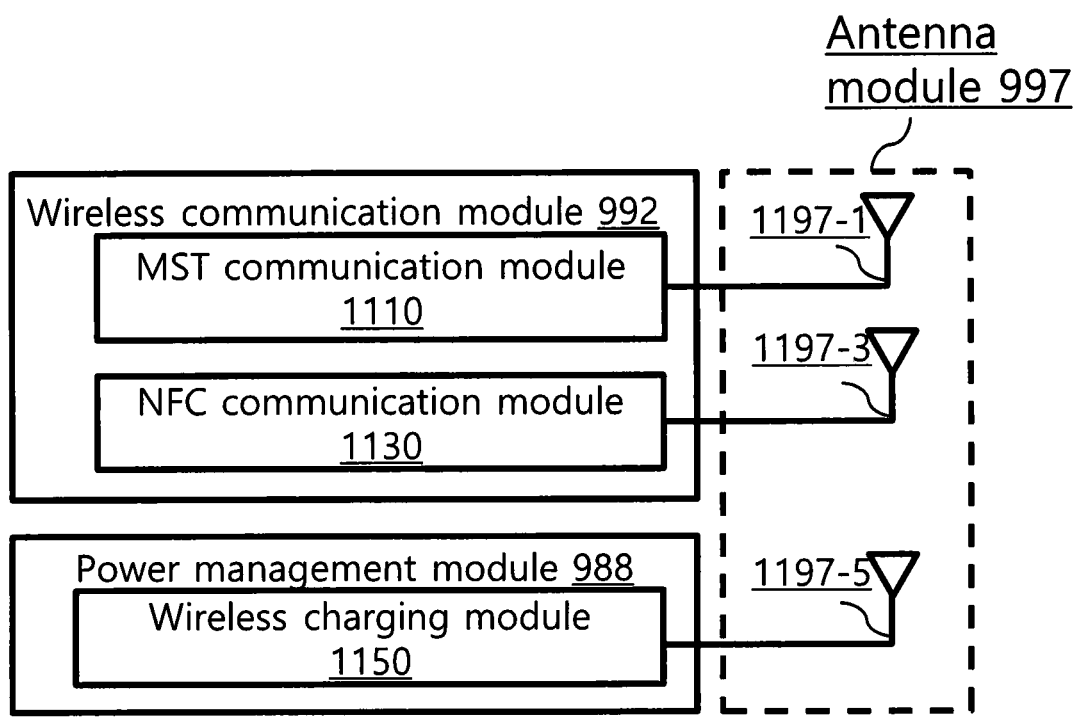
FIG. 11 is a block diagram of a wireless communication module, a power management module, and an antenna module of an electronic device, according to one embodiment.

FIG. 11 is a block diagram of the wireless communication module 992, the power management module 988, and the antenna module 997 of the electronic device 901, according to one embodiment.

Referring to FIG. 11, the wireless communication module 992 may include a magnetic secure transmission (MST) communication module 1110 or a near-field communication (NFC) module 1130, and the power management module 988 may include a wireless charging module 1150. In this case, the antenna module 997 may include a plurality of antennas that include an MST antenna 1197-1 connected with the MST communication module 1110, an NFC antenna 1197-3 connected with the NFC communication module 1130, and a wireless charging antenna 1197-5 connected with the wireless charging module 1150. Descriptions of components described above with regard to FIG. 9 are either briefly described or omitted here.

The MST communication module 1110 may receive a signal containing control information or payment information such as card (e.g., credit card) information from the processor 920, generate a magnetic signal corresponding to the received signal, and then transfer the generated magnetic signal to the external electronic device 902 (e.g., a point-of-sale (POS) device) via the MST antenna 1197-1. To generate the magnetic signal, according to one embodiment, the MST communication module 1110 may include a switching module that includes one or more switches connected with the MST antenna 1197-1, and control the switching module to change the direction of voltage or current supplied to the MST antenna 1197-1 according to the received signal. The change of the direction of the voltage or current allows the direction of the magnetic signal (e.g., a magnetic field) emitted from the MST antenna 1197-1 to change accordingly. If detected at the external electronic device 902, the magnetic signal with its direction changing may cause an effect (e.g., a waveform) similar to that of a magnetic field that is generated when a magnetic card corresponding to the card information associated with the received signal is swiped through a card reader of the electronic device 902. According to one embodiment, for example, payment-related information and a control signal that are received by the electronic device 902 in the form of the magnetic signal may be further transmitted to an external server 908 (e.g., a payment server) via the network 999.

The NFC communication module 1130 may obtain a signal containing control information or payment information such as card information from the processor 920 and transmit the obtained signal to the external electronic device 902 via the NFC antenna 1197-3. According to one embodiment, the NFC communication module 1130 may receive such a signal transmitted from the external electronic device 902 via the NFC antenna 1197-3.

The wireless charging module 1150 may wirelessly transmit power to the external electronic device 902 (e.g., a cellular phone or wearable device) via the wireless charging antenna 1197-5, or wirelessly receive power from the external electronic device 902 (e.g., a wireless charging device). The wireless charging module 1150 may support one or more of various wireless charging schemes including, for example, a magnetic resonance scheme or a magnetic induction scheme.

According to one embodiment, some of the MST antenna 1197-1, the NFC antenna 1197-3, or the wireless charging antenna 1197-5 may share at least part of their radiators. For example, the radiator of the MST antenna 1197-1 may be used as the radiator of the NFC antenna 1197-3 or the wireless charging antenna 1197-5, or vice versa. In this case, the antenna module 997 may include a switching circuit adapted to selectively connect (e.g., close) or disconnect (e.g., open) at least part of the antennas 1197-1, 1197-3, and 1197-5, for example, under control of the wireless communication module 992 (e.g., the MST communication module 1110 or the NFC communication module 1130) or the power management module (e.g., the wireless charging module 1150). For example, when the electronic device 901 uses a wireless charging function, the NFC communication module 1130 or the wireless charging module 1150 may control the switching circuit to temporarily disconnect at least one portion of the radiators shared by the NFC antenna 1197-3 and the wireless charging antenna 1197-5 from the NFC antenna 1197-3 and to connect the at least one portion of the radiators with the wireless charging antenna 1197-5.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for blind detection of resources in a wireless communication system, comprising:
   receiving soft information including at least one code block (CB);
   attempting to decode the at least one CB; and
   when the attempting to decode fails, running ultra-reliable low latency communication (URLLC) blind detection on the at least one CB
   wherein the URLLC blind detection is based on time-domain (TD) information, and
   wherein the TD based URLLC blind detection includes calculating an enhanced mobile broad band (eMBB) TD cyclic prefix (CP) correlation, calculating a URLLC TD CP correlation, and comparing a ratio between the eMBB TD CP correlation and the URLLC TD CP correlation with a predetermined threshold.

2. The method of claim 1, wherein, when URLLC is blindly detected in the at least one CB:
   setting a least likelihood ratio of the at least one CB to zero; and
   attempting to decode the soft information.

3. The method of claim 1, wherein, when no URLLC is blindly detected, updating the soft information with pre-emption information.

4. A wireless communication system, comprising:
   a temporary buffer configured to receive soft information including at least one code block (CB);
   a hybrid automatic repeat request (HARQ) buffer configured to store HARQ information to be combined with the soft information;
   a channel decoder configured to receive the combined soft information and HARQ information and attempt to decode the at least one CB; and
   an ultra-reliable low latency communication (URLLC) blind detector configured to detect whether the at least one CB is pre-empted by the URLLC when an attempt to decode the at least one CB by the channel decoder fails,
   wherein the URLLC blind detector is further configured to utilize time domain (TD) information from the soft information, and
   wherein the URLLC blind detector utilizing the TD information is further configured to calculate an enhanced mobile broad band (eMBB) TD cyclic prefix (CP) correlation, calculate a URLLC TD CP correlation, and compare a ratio between the eMBB TD CP correlation and the URLLC TD CP correlation with a predetermined threshold.

5. The system of claim 4, wherein the URLLC blind detector is further configured to, when the URLLC is blindly detected in the at least one CB, set a least likelihood ratio of the at least one CB to zero.

6. The system of claim 4, wherein the HARQ information in the HARQ buffer is updated with pre-emption information when no URLLC is blindly detected.

7. A method for blind detection of resources in a wireless communication system, comprising:
   receiving soft information including at least one code block (CB);
   attempting to decode the at least one CB; and
   when the attempting to decode fails, running ultra-reliable low latency communication (URLLC) blind detection on the at least one CB,
   wherein the URLLC blind detection is based on frequency-domain (FD) information, and
   wherein running the URLLC blind detection further includes providing FD modulation likelihood tracking.

8. The method of claim 7, wherein, when URLLC is blindly detected in the at least one CB, the method further comprises setting a least likelihood ratio of the at least one CB to zero and attempting to decode the soft information.

9. The method of claim 7, wherein, when no URLLC is blindly detected, the method further comprises updating the soft information with pre-emption information.

10. The method of claim 7, wherein the FD modulation likelihood tracking comprises checking a probability of a symbol belonging to a layer of an enhanced mobile broad band (eMBB) constellation.

11. The method of claim 7, further comprising comparing a change of consecutive values against a threshold.

12. The method of claim 7, wherein the FD modulation likelihood tracking comprises approximate likelihood tracking.

13. The method of claim 12, wherein the approximate likelihood tracking is performed using euclidian distances only.

14. A wireless communication system, comprising:
a temporary buffer configured to receive soft information including at least one code block (CB);
a hybrid automatic repeat request (HARQ) buffer configured to store HARQ information to be combined with the soft information;
a channel decoder configured to receive the combined soft information and HARQ information and attempt to decode the at least one CB; and
an ultra-reliable low latency communication (URLLC) blind detector configured to detect whether the at least one CB is pre-empted by the URLLC when an attempt to decode the at least one CB by the channel decoder fails,
wherein the URLLC blind detector is further configured to utilize frequency domain (FD) information from the soft information and provide FD modulation likelihood tracking.

15. The system of claim 14, wherein the URLLC blind detector is further configured to, when the URLLC is blindly detected in the at least one CB, set a least likelihood ratio of the at least one CB to zero.

16. The system of claim 14, wherein the HARQ information in the HARQ buffer is updated with pre-emption information when no URLLC is blindly detected.

17. The system of claim 14, wherein the FD modulation likelihood tracking comprises checking a probability of a symbol belonging to a layer of an enhanced mobile broad band (eMBB) constellation.

18. The system of claim 14, wherein the URLCC blind detector is further configured to compare a change of consecutive values against a threshold.

19. The system of claim 14, wherein the FD modulation likelihood tracking comprises approximate likelihood tracking.

20. The system of claim 19, wherein the approximate likelihood tracking is performed using euclidian distances only.

* * * * *